US006956361B1

(12) United States Patent
Mozipo et al.

(10) Patent No.: US 6,956,361 B1
(45) Date of Patent: Oct. 18, 2005

(54) DC/DC CONVERTER EMPLOYING SYNCHRONOUS RECTIFICATION

(75) Inventors: Aurelien T. Mozipo, Kokomo, IN (US); Robert D. Maple, Noblesville, IN (US); Brian J. Denta, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/890,641

(22) Filed: Jul. 14, 2004

(51) Int. Cl.[7] .............................................. G05F 1/56
(52) U.S. Cl. ..................................................... 323/283
(58) Field of Search ............................... 323/222, 282, 323/283, 284, 285, 351

(56) References Cited

U.S. PATENT DOCUMENTS

| | | | | |
|---|---|---|---|---|
| 5,982,160 A | * | 11/1999 | Walters et al. | 323/282 |
| 5,994,885 A | * | 11/1999 | Wilcox et al. | 323/285 |
| 6,091,234 A | * | 7/2000 | Kitagawa | 323/244 |
| 6,204,648 B1 | * | 3/2001 | Saeki et al. | 323/282 |
| 6,456,049 B2 | * | 9/2002 | Tsuji | 323/282 |
| 6,476,589 B2 | * | 11/2002 | Umminger et al. | 323/282 |
| 6,490,183 B2 | | 12/2002 | Zhang | |
| 6,515,463 B2 | | 2/2003 | Ling | |
| 6,870,354 B2 | * | 3/2005 | Nishimaki | 323/284 |

* cited by examiner

*Primary Examiner*—Adolf Berhane
(74) *Attorney, Agent, or Firm*—Stefan V. Chmielewski

(57) ABSTRACT

A DC/DC converter employing synchronous rectification includes an energy transfer switch, a diode, a synchronous switch, a processor and a memory subsystem. The processor estimates a diode conduction time and provides a control signal to the synchronous switch to cause the synchronous switch to conduct for a period of time equal to the estimated diode conduction time.

25 Claims, 2 Drawing Sheets

US 6,956,361 B1

DC/DC CONVERTER EMPLOYING SYNCHRONOUS RECTIFICATION

TECHNICAL FIELD

The present invention is generally directed to a DC/DC converter and, more specifically, to a DC/DC converter employing synchronous rectification.

BACKGROUND OF THE INVENTION

Synchronous rectification has been widely employed in power converters to minimize the power dissipated in conducting diodes. Synchronous rectification is implemented by paralleling conducting diodes with a switching device that has a lower voltage drop and can be controlled in such a manner as to conduct synchronously with the diode. Broadly, a direct current-to-direct current (DC/DC) power converter is any power circuit configuration that has a direct current input and a direct current output and utilizes a controlled switching action to convert from one DC voltage to another DC voltage. The input and output power may or may not be electrically isolated. Synchronous rectification control is usually implemented by analog circuits that operate in real-time or with dedicated integrated circuits (ICs) that sample the diode voltage/current at a high speed. These types of circuits can be either adaptive or predictive. Adaptive control systems maintain synchronous operation in response to changing operating conditions and changing component values. Predictive control systems use the previous switching information to control the present operation. In either case, the diode current and/or diode voltage is monitored and a synchronous switch is turned on whenever the diode would be conducting and turned off whenever the diode would not be conducting. Sensing currents and voltages can be done very fast in analog-based circuits and can also be accomplished in microprocessor-based designs if sampling is done at a very high rate.

What is needed is an advancement in the art of synchronous rectification that eliminates the need for sensing the diode current and/or diode voltage and that is adaptive and predictive.

SUMMARY OF THE INVENTION

The present invention is directed to a DC/DC converter employing synchronous rectification in one of two modes. The first mode concerns those circuit implementations that have rectifying diodes. Examples of this first type of circuit would be forward, push-pull, half-bridge and full-bridge converters. The second mode includes circuit implementations in which the diodes act as free-wheeling diodes. Examples of this second type of circuit are the buck, boost, buck-boost, Cuk, flyback and Sepic converters. The first type of converter employs an energy transfer switch, a load, a rectifying diode, a synchronous switch and, usually, a transformer. In the first type of converter, the synchronous switches are frequently self-driven, but can be controlled. Whenever the converters are controlled, they can be controlled by the techniques of the present invention.

The second type of converter employs an energy transfer switch, an energy storage circuit, a free-wheeling diode and a synchronous switch. The energy transfer switch and the synchronous switch are controlled by a synchronous control circuit that includes a processor, a memory subsystem, gate circuits and system parameter measuring circuits. The synchronous control circuit measures appropriate parameters, calculates the duty cycle of the conducting or free-wheeling diode and turns on the synchronous switch for the required conducting time.

The energy transfer switch includes a first terminal, a second terminal and a first control terminal, with the first or second terminal of the energy transfer switch being coupled to a power source. The other terminal is coupled to a load or an energy storage device, such as an inductor or a capacitor. The energy transfer switch is configured to electrically connect the first and second terminals responsive to a first control signal on the first control terminal. Additional energy transfer switches are connected in a similar manner.

The synchronous switch includes a third terminal, a fourth terminal and a second control terminal. The third terminal is coupled to an anode of the free-wheeling or rectifying diode and the fourth terminal is coupled to a cathode of the free-wheeling or rectifying diode. For simplicity, the term 'diode' is used for either a free-wheeling diode or a rectifying diode. The synchronous switch is configured to electrically connect the third and fourth terminals responsive to a second control signal on the second control terminal.

The processor is coupled to the first and second control terminals and the memory subsystem. The memory subsystem stores code that when executed by the processor instructs the processor to perform a number of steps. One step includes estimating a diode conduction time. Another step includes providing the first control signal on the first control terminal of the energy transfer switch to achieve a predetermined voltage level at the load. Yet another step includes providing the second control signal on the second control terminal of the synchronous switch to cause the synchronous switch to conduct for a time period equal to the estimated diode conduction time. According to the present invention, synchronous rectification can be achieved without requiring additional sampling.

According to another embodiment of the present invention, the estimated diode conduction time is based on component values of components of the energy storage circuit, a load value, a switching frequency of the energy transfer switch and a duty cycle of the energy transfer switch. According to yet another aspect of the present invention, the converter includes a temperature sensor positioned to measure the temperature of an inductor. In this embodiment, the memory subsystem stores additional code that when executed by the processor instructs the processor to perform the step of adjusting an inductance value of the inductor based upon the temperature sensed by the temperature sensor. The adjusted inductance value is then used to estimate the diode conduction time.

According to still another aspect of the present invention, the converter includes a current sensor positioned to sense a load current. In this embodiment, the memory subsystem stores additional code that when executed by the processor instructs the processor to perform the additional step of adjusting the inductance value of the inductor based upon the load current sensed by the current sensor. In this embodiment, the adjusted inductance value is then used to estimate the diode conduction time. It should be appreciated that the diode may be integrated with the synchronous switch. The synchronous switch and the energy transfer switch may be, for example, field-effect transistors (FETs) or any switching device with lower losses than the diode. In another embodiment of the present invention, the component values of the converter circuit are aged to account for age drift and the aged component values are then used to estimate the diode conduction time.

In yet another embodiment of the present invention, the memory subsystem stores additional code that when executed by the processor instructs the processor to perform the step of terminating the second control signal when a load current to the load drops below a predetermined load current level. In this manner, the converter can prevent the energy storage circuit from sourcing current back into the synchronous switch, and thereby discharging itself.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

As mentioned above, synchronous rectification provides a way to reduce conduction losses in a converter by eliminating losses due to diode conduction. In a typical implementation, a switch, such as a field-effect transistor (FET) or other switching device, which exhibits significantly fewer losses than the diode, is implemented in parallel with the diode. The switch (transistor) is then turned off and on in an attempt to mirror the diode conduction time.

Figure 1:
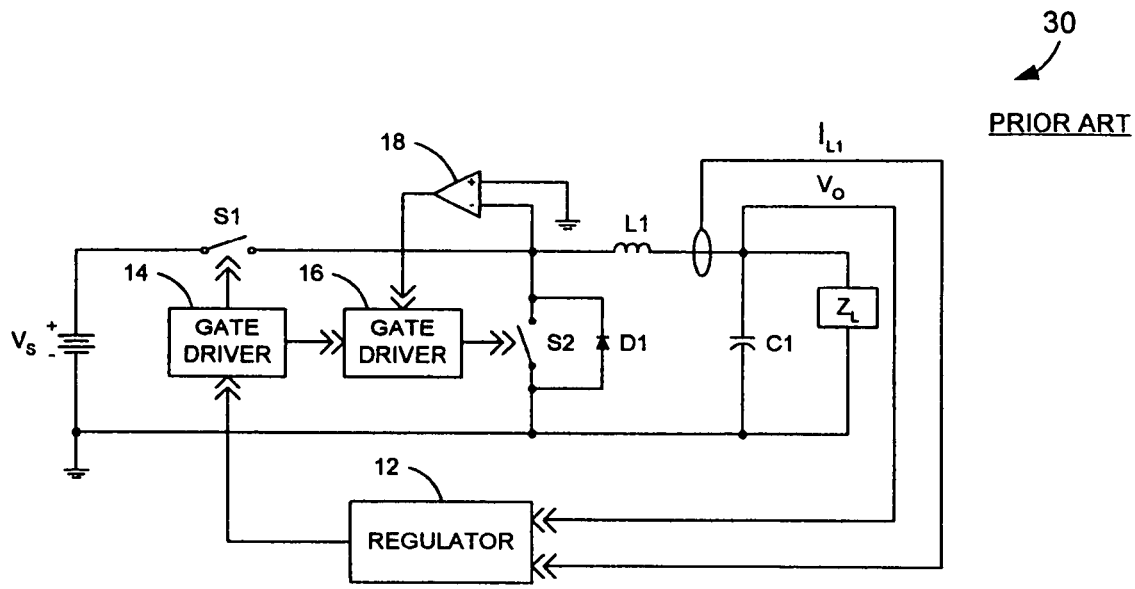
FIG. 1 is an electrical schematic of a prior art buck converter that implements adaptive synchronous rectification.

With reference to FIG. 1, a prior art buck converter 30, which implements adaptive synchronous rectification, is illustrated. As is shown in FIG. 1, a regulator 12 senses an inductor current $I_{L1}$ and an output voltage $V_O$ and in response thereto provides a control signal to a gate driver 14. A first output of the driver 14 is coupled to a control terminal of an energy transfer switch S1 and a second output of the driver 14 is coupled to a first input of a gate driver 16, whose output is coupled to a control terminal of a synchronous switch S2. The regulator 12 senses the output voltage $V_o$ and provides a control signal that modulates the on-time of the energy transfer switch S1 to deliver a desired output voltage $V_o$ across the load $Z_L$. The gate driver 14 also provides a control signal to the first input of the driver 16 to ensure that the switches S1 and S2 do not simultaneously conduct, i.e., to prevent shoot-through. As is shown, a voltage source $V_S$ is coupled to the load $Z_L$, via the energy transfer switch S1 and an inductor L1, and a filter capacitor C1 is coupled in parallel to the load $Z_L$.

An inductor current direction sensing comparator 18 is coupled on a source side of the inductor L1 and provides a control signal to a second input of the gate driver 16. The control signal at the second input of the gate driver 16 commands the switch S2 to open, when a current is flowing out of the load $Z_L$ and into the converter 30. As is shown, the free-wheeling diode D1 is coupled in parallel to the switch S2 and functions to block current flow when the switch S2 is in an open state.

Figure 2:
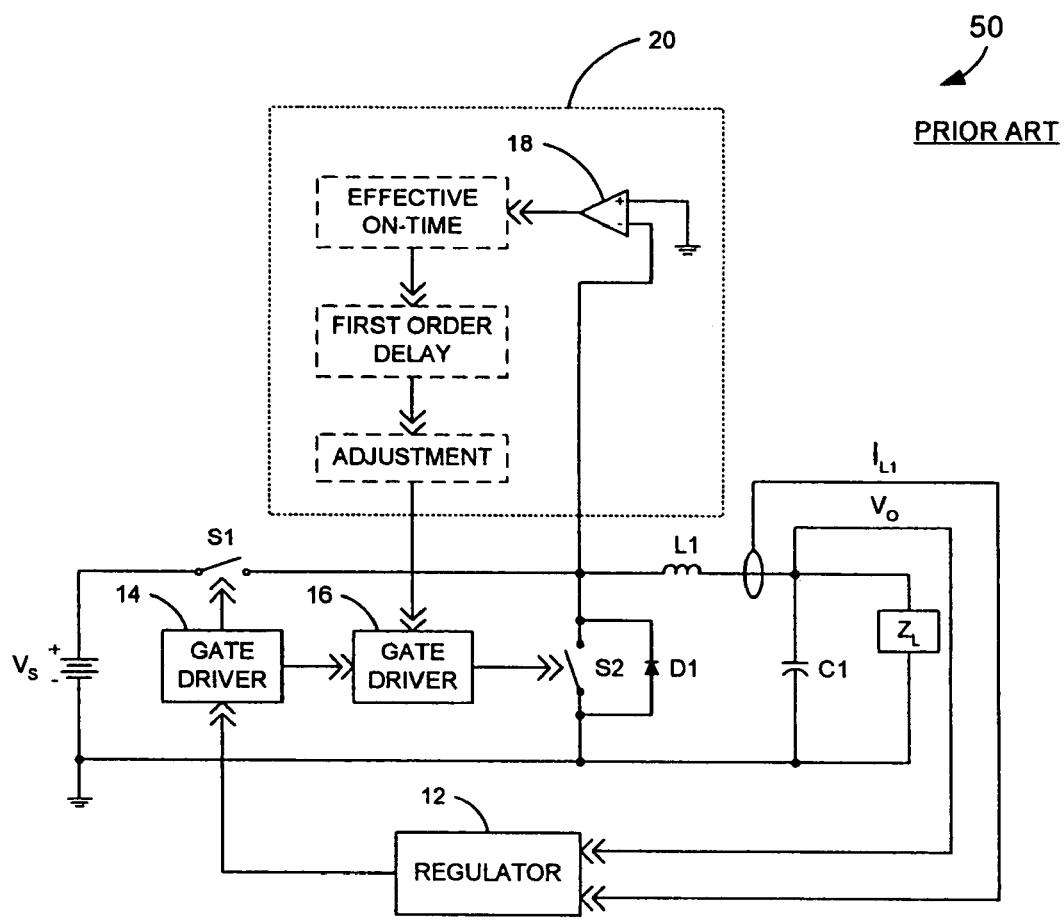
FIG. 2 is an electrical schematic of a prior art buck converter that implements predictive synchronous rectification.

With reference to FIG. 2, another prior art buck converter 50, which implements predictive synchronous rectification, is depicted. In this case, the on-time of the synchronous switch S2 is preset, based upon a previous switching cycle effective conduction on-time. An inductor current direction sensing and predictive delay controller 20 is configured to sense the direction of the current to the inductor L1 and to predict the on-time for the switch S2, based upon a previous switching cycle on-time. The controller 20 is hard-wired to implement an effective on-time and provide adjustment for the on-time, based upon a previous on-time.

According to the present invention, an on-time of a synchronous switch is estimated, as opposed to being controlled, based upon sensing. For the various converter topologies, buck, boost or others, one can readily derive an algebraic expression of the diode conduction time. In general, the expression is a function of the converter components, the load, the switching frequency and the duty cycle of the energy transfer switch. Typically, a converter that estimates a synchronous switch on-time provides efficiency gains similar to other synchronous rectification techniques. As the converter components are influenced by various factors, such as current and temperature, it is desirable to further refine the estimated synchronous switch on-time by adjusting it accordingly. However, the influence of the inductor current is typically only noticeable at light loads, when the converter is operating in a discontinuous current mode. In general, the converter component that most affects the on-time estimation is the inductor. It should be appreciated that an inductance value of the converter inductor changes with the load current. The rate of change, with respect to the current and other factors, can be evaluated and taken into account when estimating the synchronous switch on-time.

An exemplary equation for determining a synchronous switch on-time for a buck converter is set forth below:

$$D_1 = \frac{-D + \sqrt{D^2 \frac{8L}{RT}}}{2}$$

where D is the duty cycle (energy transfer switch on-time divided by the switching period) computed by the control algorithm; L is an inductance value of the inductor L1; T is the time of the switching period; and R is the impedance value of the load $Z_L$ (which can be estimated as the output voltage $V_o$ divided by the output current $I_o$).

According to the present invention, implementing an equation, similar to the above-referenced equation, readily allows for microprocessor-based estimation of a synchronous switch on-time. It should be appreciated that the inductor value may be adjusted with ambient temperature and current. After estimating the synchronous switch on-time, a dead-time is subtracted. When the energy transfer switch is turned off, the synchronous switch is then turned on for the estimated time, assuming the converter is operating in a discontinuous current mode. As such, the synchronous switch, as opposed to the diode, conducts current, which reduces losses and increases efficiency of the converter. When the current is continuous, i.e., when $D_1 \geq 1-D$, the synchronous switch is kept on for the remainder of the switching cycle.

An exemplary equation for determining an on-time of a synchronous switch implemented as a boost converter is set forth below:

$$D_1 = \frac{L}{RDT}\left(1 + \sqrt{1 + \frac{2D^2RT}{L}}\right)$$

The parameters of the equation set forth immediately above have the same meaning as given to the variables for the buck converter equation.

Figure 3:
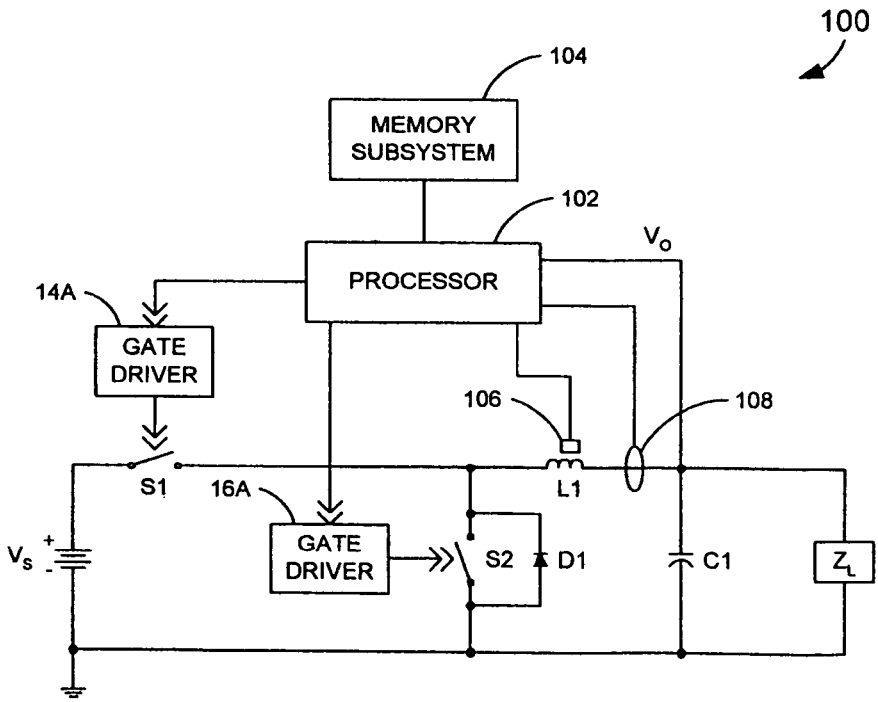
FIG. 3 is an electrical schematic of a buck converter that implements software-based synchronous rectification, according to the present invention.

With reference to FIG. 3, a software-based synchronous buck converter 100 is further depicted. As is shown in FIG. 3, a processor 102 is coupled to a memory subsystem 104, a gate driver 14A and a gate driver 16A. The processor 102 is also coupled to a temperature sensor 106 and a current sensor, e.g., a current loop 108. The current sensor 108 is positioned to sense a current through the inductor L1. The processor 102 is also coupled across the load $Z_L$ to measure a load voltage $V_o$. A source $V_S$ is coupled to a first terminal of an energy transfer switch S1 and a second terminal of the energy transfer switch S1 is coupled to one side of the inductor L1. An output of the gate driver 14A is coupled to a control terminal of the switch S1. An output of the gate driver 16A is coupled to a control terminal of the synchronous switch S2, whose first terminal is coupled to the first side of the inductor L1 and a second side is coupled to ground.

As is depicted, the switch S2 is coupled across the diode D1 and a capacitor C1 is coupled across the load $Z_L$. According to the present invention, the processor 102 computes the on-time for the synchronous switch S2, based on a variety of factors, for example, average load current, the input and output voltages, the duty cycle of the energy transfer switch S1 and the converter component values, i.e., the value of the inductor L1 and the value of the capacitor C1. It should be appreciated that a converter designed according to the present invention eliminates the need for external additional sensing components, other than the microcontroller, and therefore provides a synchronous rectification converter with essentially no additional hardware.

Accordingly, a DC/DC converter employing synchronous rectification has been described herein that utilizes an estimated diode conduction time to determine an on-time for a synchronous switch. Such a DC/DC converter can be advantageously implemented in environments that increasingly require relatively accurate control of pulse width modulated power supplies to maximize efficiency of the power supplies.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A DC/DC converter employing synchronous rectification, comprising:
an energy transfer switch including a first terminal, a second terminal and a first control terminal, wherein the first terminal of the energy transfer switch is coupled to a power source, and wherein the energy transfer switch is configured to provide a low impedance path between the first and second terminals responsive to a first control signal on the first control terminal;
a diode coupled to the second terminal of the energy transfer switch and an electrical load;
a synchronous switch including a third terminal, a fourth terminal and a second control terminal, wherein the third terminal is coupled to an anode of the diode and the fourth terminal is coupled to a cathode of the diode, and wherein the synchronous switch is configured to provide a low impedance path between the third and fourth terminals responsive to a second control signal on the second control terminal;
a processor coupled to the first and second control terminals; and
a memory subsystem coupled to the processor, the memory subsystem storing code that when executed by the processor instructs the processor to perform the steps of:
estimating a conduction time of the diode;
providing the first control signal on the first control terminal of the energy transfer switch to achieve a predetermined voltage level at the load; and
providing the second control signal on the second control terminal of the synchronous switch to cause the synchronous switch to conduct for a time period substantially equal to the estimated diode conduction time.

2. The converter of claim 1, further comprising:
an energy storage circuit coupled between the second terminal of the energy transfer switch and the electrical load, the energy storage circuit including an inductor and a capacitor.

3. The converter of claim 2, wherein the estimated diode conduction time is based on component values of components of the energy storage circuit, a load value, a switching frequency of the energy transfer switch and a duty cycle of the energy transfer switch.

4. The converter of claim 2, further comprising:
a temperature sensor positioned to measure a temperature of the inductor, the memory subsystem storing additional code that when executed by the processor instructs the processor to perform the additional step of:
adjusting an inductance value of the inductor based upon the temperature sensed by the temperature sensor, wherein the adjusted inductance value is used to estimate the diode conduction time.

5. The converter of claim 4, further including:
a current sensor positioned to sense a load current provided to the load, the memory subsystem storing additional code that when executed by the processor instructs the processor to perform the additional step of:
adjusting the inductance value of the inductor based upon the load current sensed by the current sensor, wherein the adjusted inductance value is used to estimate the diode conduction time.

6. The converter of claim 5, wherein the estimated diode conduction time is estimated based on component values of components of the energy storage circuit, a load value, a switching frequency of the energy transfer switch and a duty cycle of the energy transfer switch.

7. The converter of claim 1, wherein the diode is integrated with the synchronous switch.

8. The converter of claim 1, wherein the converter is configured as one of a buck converter, a boost converter, a buck-boost converter, a flyback converter, a SEPIC converter and a CUK converter.

9. The converter of claim 1, wherein the switches are field-effect transistors (FETs).

10. The converter of claim 3, wherein the component values are aged to account for age drift, and wherein the aged component values are used to estimate the diode conduction time.

11. The converter of claim 2, wherein the step of providing the second control signal on the second control terminal of the synchronous switch to cause the synchronous switch to conduct for a time period equal to the estimated diode conduction time further includes the step of:
   terminating the second control signal when a load current to the load drops below a predetermined load current level.

12. The converter of claim 1, wherein the diode acts as one of a rectifying diode and a free-wheeling diode.

13. The converter of claim 1, wherein the converter is configured as one of a forward converter, a push-pull converter, a half-bridge converter and a full-bridge converter.

14. A DC/DC converter employing synchronous rectification, comprising:
   an energy transfer switch including a first terminal, a second terminal and a first control terminal, wherein the first terminal of the energy transfer switch is coupled to a power source, and wherein the energy transfer switch is configured to provide a low impedance path between the first and second terminals responsive to a first control signal on the first control terminal;
   a diode coupled to the second terminal of the energy transfer switch and an electrical load;
   a synchronous switch including a third terminal, a fourth terminal and a second control terminal, wherein the third terminal is coupled to an anode of the diode and the fourth terminal is coupled to a cathode of the diode, and wherein the synchronous switch is configured to provide a low impedance path between the third and fourth terminals responsive to a second control signal on the second control terminal;
   an energy storage circuit coupled between the second terminal of the energy transfer switch and the electrical load, the energy storage circuit including an inductor and a capacitor;
   a processor coupled to the first and second control terminals; and
   a memory subsystem coupled to the processor, the memory subsystem storing code that when executed by the processor instructs the processor to perform the steps of:
      estimating a conduction time of the diode;
      providing the first control signal on the first control terminal of the energy transfer switch to achieve a predetermined voltage level at the load; and
      providing the second control signal on the second control terminal of the synchronous switch to cause the synchronous switch to conduct for a time period substantially equal to the estimated diode conduction time.

15. The converter of claim 14, wherein the estimated diode conduction time is based on component values of components of the energy storage circuit, a load value, a switching frequency of the energy transfer switch and a duty cycle of the energy transfer switch.

16. The converter of claim 15, further comprising:
   a temperature sensor positioned to measure a temperature of the inductor, the memory subsystem storing additional code that when executed by the processor instructs the processor to perform the additional step of:
      adjusting an inductance value of the inductor based upon the temperature sensed by the temperature sensor, wherein the adjusted inductance value is used to estimate the diode conduction time.

17. The converter of claim 16, further including:
   a current sensor positioned to sense a load current provided to the load, the memory subsystem storing additional code that when executed by the processor instructs the processor to perform the additional step of:
      adjusting the inductance value of the inductor based upon the load current sensed by the current sensor, wherein the adjusted inductance value is used to estimate the diode conduction time.

18. The converter of claim 17, wherein the estimated diode conduction time is estimated based on component values of components of the energy storage circuit, a load value, a switching frequency of the energy transfer switch and a duty cycle of the energy transfer switch.

19. The converter of claim 14, wherein the diode is integrated with the synchronous switch.

20. The converter of claim 14, wherein the converter is configured as one of a buck converter, a boost converter, a buck-boost converter, a flyback converter, a SEPIC converter and a CUK converter.

21. A DC/DC converter employing synchronous rectification, comprising:
   an energy transfer switch including a first terminal, a second terminal and a first control terminal, wherein the first terminal of the energy transfer switch is coupled to a power source, and wherein the energy transfer switch is configured to provide a low impedance path between the first and second terminals responsive to a first control signal on the first control terminal;
   a diode coupled to the second terminal of the energy transfer switch and an electrical load;
   a synchronous switch including a third terminal, a fourth terminal and a second control terminal, wherein the third terminal is coupled to an anode of the diode and the fourth terminal is coupled to a cathode of the diode, and wherein the synchronous switch is configured to provide a low impedance path between the third and fourth terminals responsive to a second control signal on the second control terminal;
   a processor coupled to the first and second control terminals; and
   a memory subsystem coupled to the processor, the memory subsystem storing code that when executed by the processor instructs the processor to perform the steps of:
      estimating a conduction time of the diode;
      providing the first control signal on the first control terminal of the energy transfer switch to achieve a predetermined voltage level at the load; and
      providing the second control signal on the second control terminal of the synchronous switch to cause the synchronous switch to conduct for a time period substantially equal to the estimated diode conduction time, wherein the converter is configured as one of a forward converter, a push-pull converter, a half-bridge converter and a full-bridge converter.

22. The converter of claim 21, wherein the estimated diode conduction time is based on a load value, a switching frequency of the energy transfer switch and a duty cycle of the energy transfer switch.

23. The converter of claim 21, wherein the diode is integrated with the synchronous switch.

24. The converter of claim 21, wherein the switches are field-effect transistors (FETs).

25. The converter of claim 21, wherein the diode acts as a rectifying diode.

* * * * *